(12) United States Patent
Nishida et al.

(10) Patent No.: US 6,831,449 B2
(45) Date of Patent: Dec. 14, 2004

(54) CURRENT DETERMINATION CIRCUIT, AND IMAGE PRINTING APPARATUS HAVING CURRENT DETERMINATION CIRCUIT

(75) Inventors: Hideyuki Nishida, Kanagawa (JP); Kazunori Masuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/352,899

(22) Filed: Jan. 29, 2003

(65) Prior Publication Data

US 2003/0141857 A1 Jul. 31, 2003

(30) Foreign Application Priority Data

Jan. 31, 2002 (JP) ........................................ 2002-024108

(51) Int. Cl.[7] ................................................ G05F 1/44
(52) U.S. Cl. ...................... 323/284; 323/277; 323/222
(58) Field of Search ................................ 323/238, 276, 323/277, 282, 284, 285, 222; 347/5, 14

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/10 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,608,577 A | 8/1986 | Hori | 347/66 |
| 4,723,129 A | 2/1988 | Endo et al. | 347/56 |
| 4,740,796 A | 4/1988 | Endo et al. | 347/56 |
| 5,821,740 A * | 10/1998 | Hodgins et al. | 323/277 |
| 2002/0145639 A1 | 10/2002 | Masuda et al. | 347/14 |
| 2002/0171695 A1 | 11/2002 | Masuda | 347/23.1 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 5-64425 | 3/1993 |
| JP | 5-292742 | 11/1993 |
| JP | 6-201738 | 7/1994 |
| JP | 10-6505 | 1/1998 |

* cited by examiner

*Primary Examiner*—Jessica Han
(74) *Attorney, Agent, or Firm*—Fitzpatrick, Cella, Harper & Scinto

(57) ABSTRACT

A power supply device which converts a voltage by a switching method is connected to a load. Whether a current supplied from the power supply device to the load falls within a proper range is determined. At this time, while preventing an increase in cost in current detection and reducing Joule loss caused by an unwanted resistance component, it is determined that the current falls within the proper range. In order to determine a current supplied from a DC/DC converter to the load, a current determination unit (1) is arranged. The current determination unit (1) compares, with a preset voltage, a voltage obtained by DC-detecting a gate driving pulse signal used to turn on/off a switching MOS transistor (3), thereby determining whether the current flowing from the DC/DC converter to the load exceeds a predetermined current (proper range). In current detection, Joule loss by an unwanted resistance component can be reduced.

13 Claims, 15 Drawing Sheets

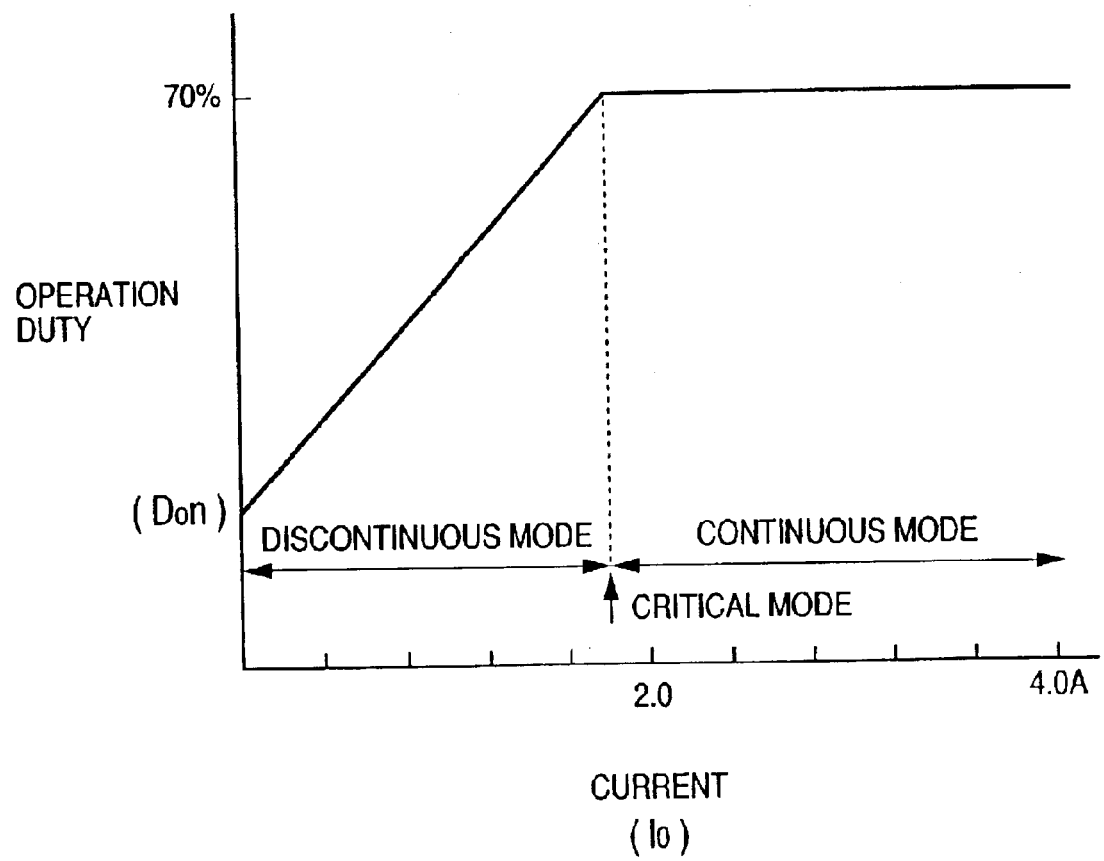

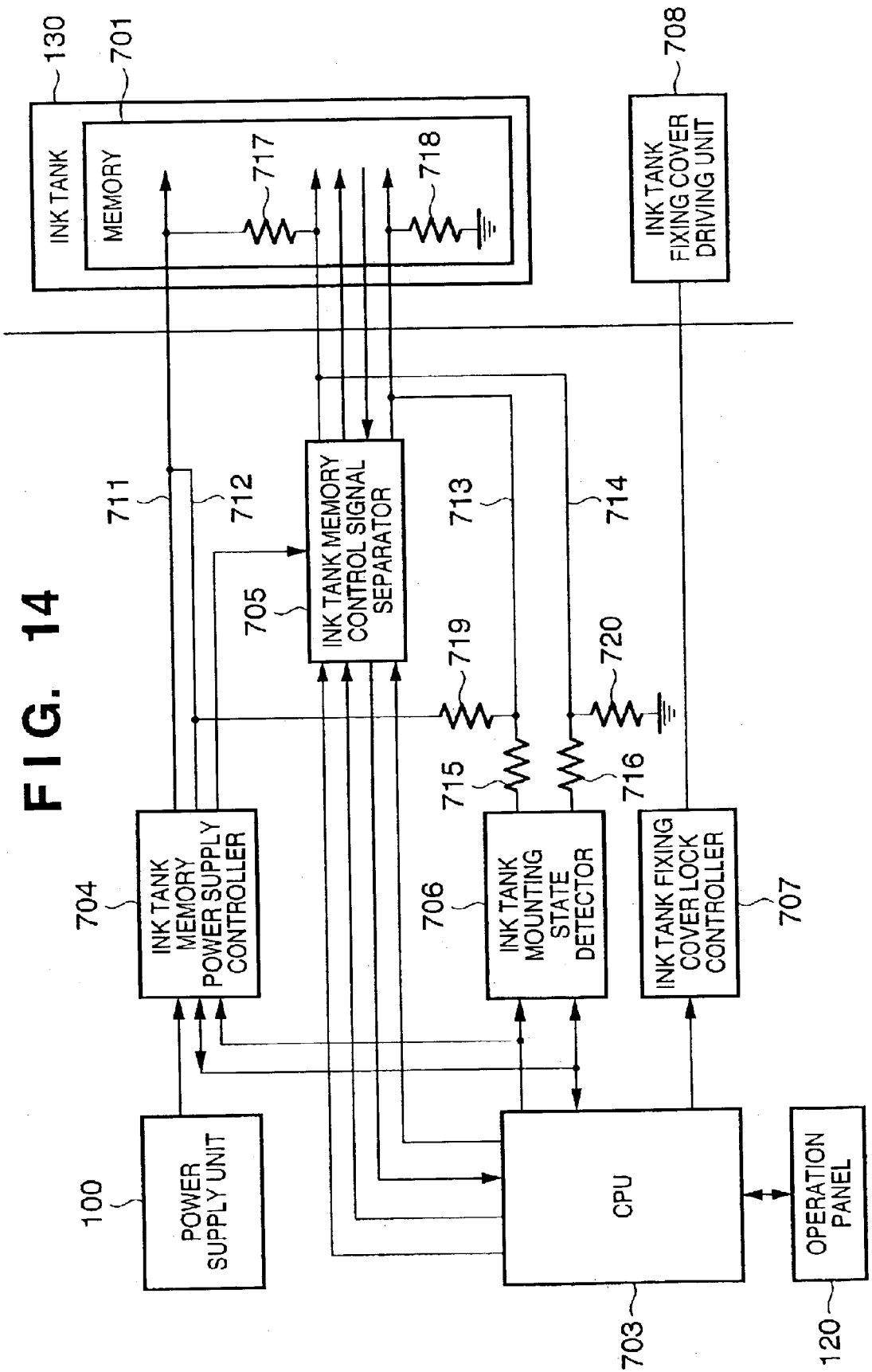

CURRENT DETERMINATION CIRCUIT, AND IMAGE PRINTING APPARATUS HAVING CURRENT DETERMINATION CIRCUIT

FIELD OF THE INVENTION

The present invention relates to a current determination circuit which detects and determines a current supplied from a power supply device when the power supply device, which converts a voltage by a switching method using, e.g., a semiconductor element, is used by connecting the power supply device to a load such as an electrical device, and an image printing apparatus using a power supply device which incorporates the current determination circuit.

BACKGROUND OF THE INVENTION

A power supply device which is used in many electrical devices and supplies power preferably detects a load current supplied from the power supply device and determines the load state. This is achieved by, e.g., an overcurrent protection circuit incorporated in a widely used power supply device.

A general method of detecting a supplied load current is a method using a "current detection resistor" in which the load current is detected as a voltage drop by a detection resistance component.

In the method using the "current detection resistor", a larger load current increases the loss by Joule heat generated by the "current detection resistor". Various methods which solve this problem have been disclosed.

For example, Japanese Patent Laid-Open No. 6-201738 ("Current Detection Circuit") uses "the ON resistance (Rdon) of a switching MOS transistor" through which the load current flows, instead of the "current detection resistor". The characteristic of "the ON resistance of the switching MOS transistor" is influenced by variations between switching MOS transistor lots of the same manufacturer, and also readily influenced by the use environment (e.g., temperature).

To employ a method of detecting a load current supplied from the power supply device by using "the ON resistance of the switching MOS transistor", switching MOS transistors with the same characteristic are desirably stably supplied. For this purpose, it is desirable to freely use switching MOS transistors of not one manufacturer but a plurality of manufacturers.

For the switching MOS transistor having the above-mentioned characteristic, a substitute of a different manufacturer fails to obtain the same characteristic. It is therefore difficult in terms of practical use to adopt the load current detection method using "the ON resistance of the switching MOS transistor" under this restriction.

Another method which does not use any resistance component such as the "current detection resistor" is a method of "detecting a load current as a magnetic component and converting the load current into a physical amount", i.e., a method of converting a current into a voltage amount via a magnetic component. As an example of this method, a current detection coil called a "current transformer" is used, or a current flowing through a reactor is detected by a Hall element as a magnetic sensor. This method is disclosed in Japanese Patent Laid-Open No. 5-64425 ("Overcurrent Detection Circuit of Step-Up Converter").

The method of "detecting a load current as a magnetic component and converting the load current into a physical amount" can advantageously decrease the loss caused by Joule heat in comparison with the use of the "current detection resistor", and increase the current detection precision.

However, the current detection coil and Hall element are expensive and must be mounted at a location where they can detect a magnetic component, resulting in low usability.

As still another method, Japanese Patent Laid-Open No. 5-292742 ("Switching Power Supply Device") discloses a current detection circuit which is electrically connected to the two terminals of a flywheel diode and constituted by a voltage-dividing resistor, filter capacitor, and voltage amplifier.

According to this method, a current flowing through the flywheel diode in proportion to the load current is extracted in mounting. An unwanted loop antenna may be formed depending on the wiring pattern of a printed circuit board, which poses a serious problem in a power supply which should suppress generation of power noise.

As described in "BACKGROUND OF THE INVENTION", the method of detecting a load current supplied from a power supply device which is used in an electrical device and supplies power suffers problems: (1) the precision is high, but the detection loss is large; (2) the precision is high, but the cost is high; and (3) noise may be generated.

For this reason, the above-described load current detection method cannot be applied to an energy-saving electrical device such as a recently popular printer (e.g., a large-format printer).

When the current is required to be detected in an electrical device, the absolute precision of a continuous current value is not often measured. In many cases, it is sufficient to detect a current value in a specific load state and determine the load state.

For example, the load current used in an overcurrent protection circuit is detected to detect a current in a load state and determine (decide) the operation start time of the overcurrent protection circuit in order to determine the start point of the overcurrent protect operation. In this case, it suffices to determine whether the load current exceeds a preset current value, and the load current need not be continuously measured at a high precision.

SUMMARY OF THE INVENTION

The present invention has been made to overcome the conventional drawbacks, and has as its object to provide a current determination circuit capable of determining that the current falls within a proper range while preventing an increase in cost in current detection and reducing Joule loss caused by an unwanted resistance component without employing any method such as a method using a current detection resistance, a method using the ON resistance of a switching MOS transistor, or a current detection method using a current detection coil or Hall element when a power supply device which converts a voltage by a switching method using a semiconductor element is connected to a load (electrical device) and it is determined whether a current supplied from the power supply device to the load falls within a proper range.

It is another object of the present invention to provide an image printing apparatus which uses a power supply device having the current determination circuit as a power supply device for supplying power in the image printing apparatus, and even if a printhead error occurs in printing, can detect the error before printing and prevent wasteful printing suffering from the printing error.

To achieve the above objects, a current determination circuit according to an aspect of the present invention has the following arrangement. That is, a current determination circuit which determines a current value supplied to a load from a power supply device having a power supply circuit which converts an input voltage by turning on/off switching means comprises detection means for detecting a predetermined signal on the basis of an ON/OFF signal used to turn on/off the switching means, and current determination means for determining based on the predetermined signal, of a plurality of ranges, a range within which the current value supplied from the power supply device to the load falls.

For example, the plurality of ranges are preferably two ranges including a range in which the current value is not less than a predetermined current value, and a range in which the current value is smaller than the predetermined current value.

For example, the detection means preferably DC-detects the ON/OFF signal to detect a voltage level corresponding to the ON/OFF signal.

For example, the current determination means preferably compares the voltage level with a predetermined voltage level set in advance, and when the voltage level exceeds the predetermined voltage level, determines that the current value supplied from the power supply device to the load is not less than the predetermined value.

For example, the detection means preferably detects a time width corresponding to an ON time of the ON/OFF signal.

For example, the current determination means preferably compares the time width with a predetermined time width set in advance, and when the time width exceeds the predetermined time width, determines that the current value supplied from the power supply device to the load is not less than the predetermined value.

For example, the power supply device preferably includes a DC/DC converter which steps up or down the input voltage.

For example, the current determination circuit preferably further comprises discontinuous mode determination means for determining based on the ON/OFF signal whether a mode of a current flowing through an inductor of the DC/DC converter is a discontinuous mode in which all energy accumulated in the inductor during an ON signal period of the ON/OFF signal is discharged during an OFF signal period, or a continuous mode in which not all energy accumulated in the inductor during the ON signal period of the ON/OFF signal is discharged during the OFF signal period but energy is accumulated in the inductor.

For example, the discontinuous mode determination means preferably determines, as the discontinuous mode, a case in which an oscillation waveform is generated during the OFF signal period of the ON/OFF signal.

To achieve the above objects, an image printing apparatus according to another aspect of the present invention has the following arrangement. That is, an image printing apparatus comprises a power supply device having a power supply circuit which converts an input voltage by turning on/off switching means, and a current determination circuit which determines a current value supplied from the power supply device to a load, the current determination circuit having detection means for detecting a predetermined signal on the basis of an ON/OFF signal used to turn on/off the switching means, and current determination means for determining based on the predetermined signal, of a plurality of ranges, a range within which the current value supplied from the power supply device to the load falls.

For example, a timing at which a current flowing from the power supply device to the image printing apparatus is determined using the current determination circuit preferably includes a timing when the image printing apparatus does not print an image.

For example, the image printing apparatus preferably further comprises an ink-jet printhead which discharges ink to print information.

For example, it is preferable that the printhead include a printhead which discharges ink by using heat energy, and comprise a heat energy converter for generating heat energy to be applied to ink.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8B is a chart showing the current flowing through a load and the operation duty;

FIG. 14 is a block diagram showing the arrangement of the controller of the ink-jet printer.

DETAILED DESCRIPTION OF THE PREFERRED EMBODIMENTS

Preferred embodiments of the present invention will now be described in detail in accordance with the accompanying drawings.

[First Embodiment]

A power supply device having a current determination circuit according to the first embodiment of the present invention and an image printing apparatus having the power supply device will be described below with reference to the accompanying drawings.

In the following description, of ink-jet printers, a large-format printing ink-jet printer 1000 suitable for printing a large-format image will be explained as the image printing apparatus. However, the scope of the present invention is not limited to it.

In this specification, "printing" or "print" is to form an image, design, pattern, or the like on a printing medium or process a medium regardless of whether to form significant information such as a character or figure, whether information is significant or insignificant, or whether information is so visualized as to allow a user to visually perceive it.

"Printing media" are not only paper used in a general printing apparatus, but also ink-receivable materials such as cloth, plastic film, a metal plate, glass, ceramics, wood, and leather.

"Ink" (to be also referred to as "liquid") should be interpreted as broadly as the definition of "printing (print)". "Ink" represents a liquid which is applied to a printing medium to form an image, design, pattern, or the like, process the printing medium, or contribute to ink processing (e.g., solidification or insolubilization of a coloring material in ink applied to a printing medium).

Figure 12:
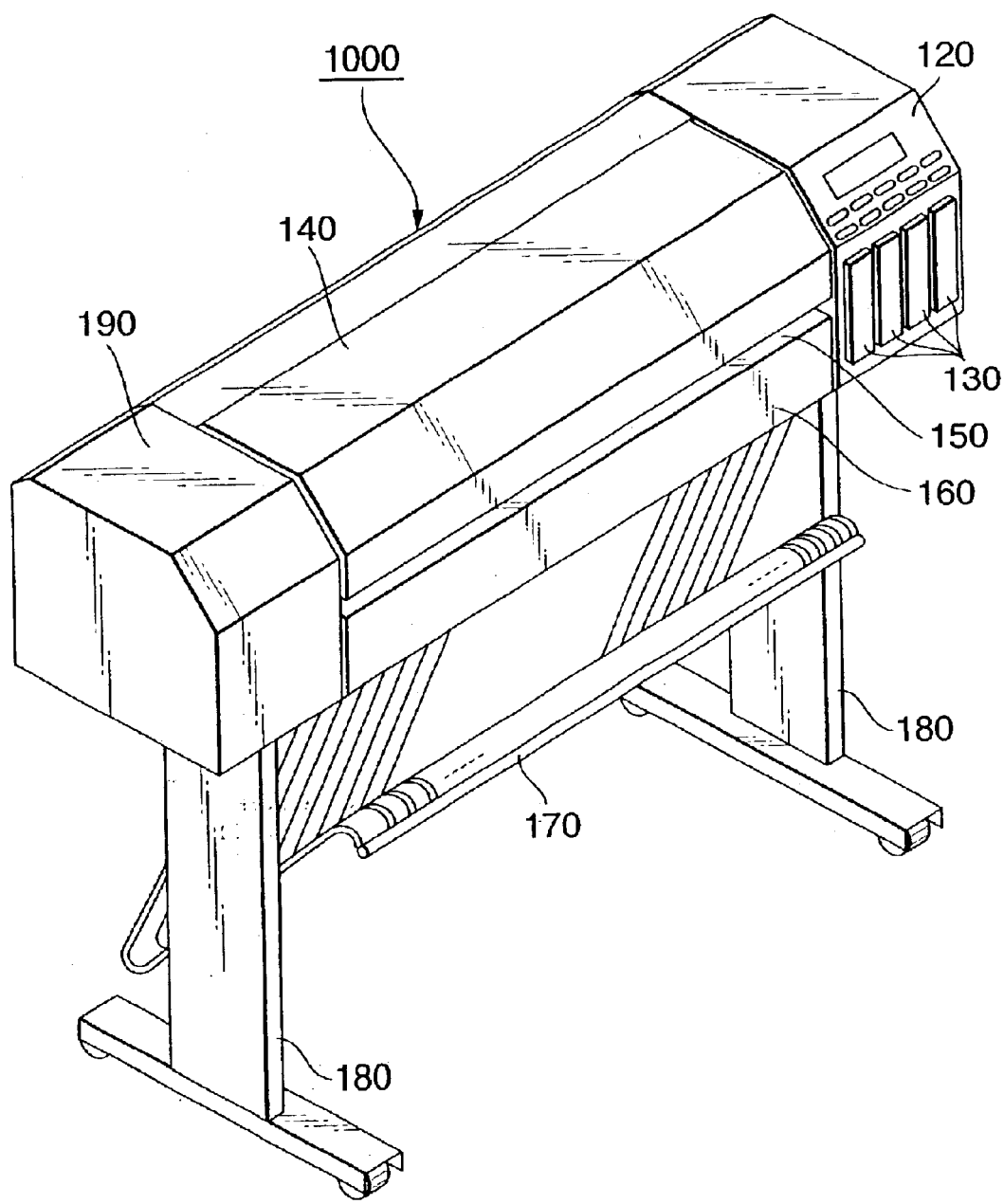
FIG. 12 is a perspective view showing the outer appearance of an ink-jet printer.
Figure 13:
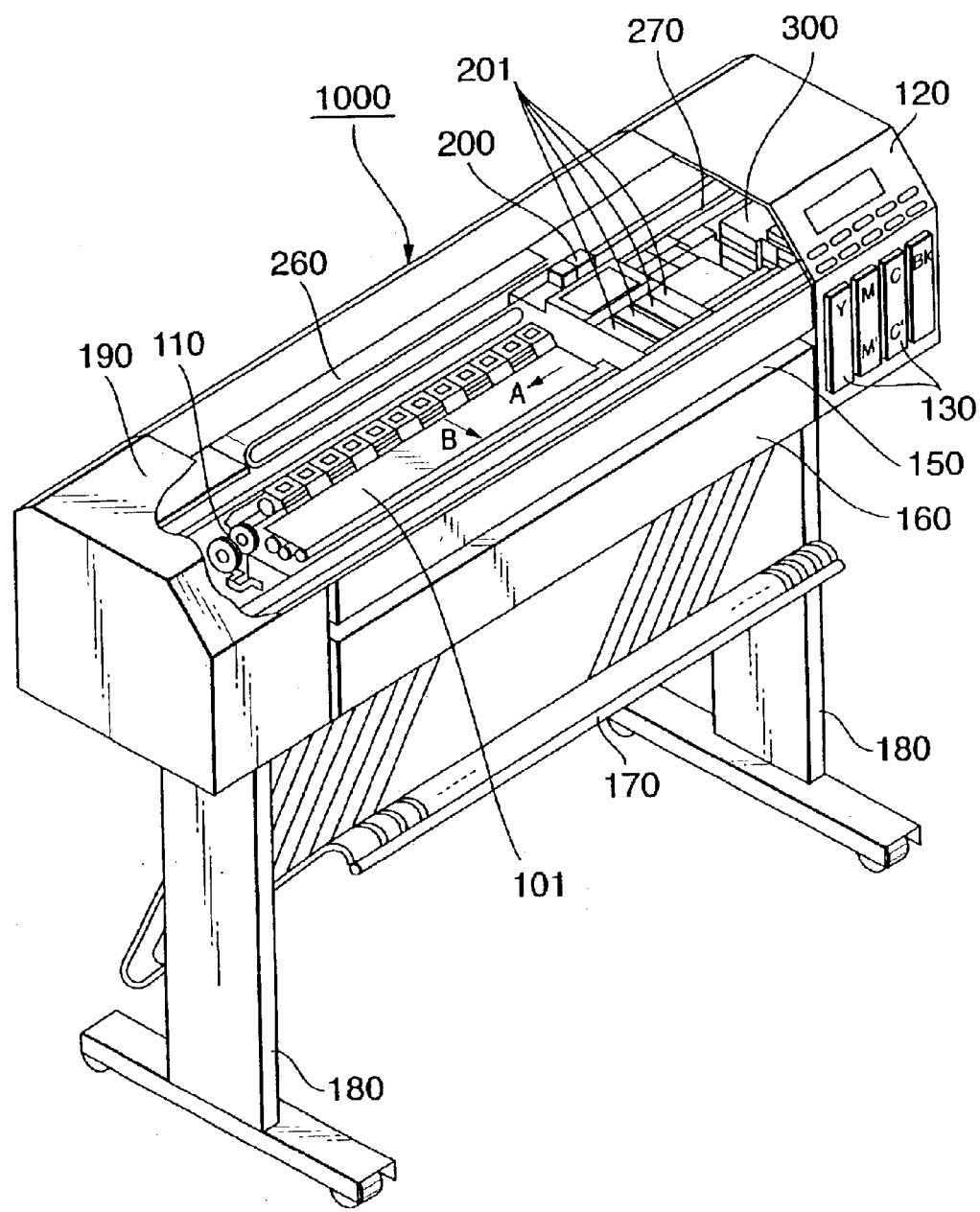
FIG. 13 is a perspective view showing a state in which the upper cover of the ink-jet printer is removed.

[Ink-Jet Printer (Large-Format Printer): FIGS. 12 and 13]

The ink-jet printer 1000 which incorporates a power supply unit 100 will be first described. A power supply device having a current determination circuit 1 and an application of the power supply device as the power supply unit 100 of the ink-jet printer 1000 will be then described.

FIG. 12 is a perspective view showing the outer appearance of the ink-jet printer 1000. FIG. 13 is a perspective view showing a state in which the upper cover of the ink-jet printer 1000 in FIG. 12 is removed.

In FIGS. 12 and 13, a manual feed port 150 is formed in the front surface of the ink-jet printer 1000, and a roll unit 160 openable to the front is arranged below the manual feed port 150. A printing medium 101 (FIG. 13) such as a printing sheet is supplied from the manual feed port 150 or roll unit 160 to a printing portion.

The ink-jet printer 1000 comprises an ink-jet printer main body 190 supported by two legs 180, a stacker 170 which stacks discharged printing media 101, and a transparent openable/closable upper cover 140 which allows viewing of the interior.

As shown in FIG. 13, an operation panel 120, supply/recovery unit 300, and ink tanks 130 are arranged on the right side of the ink-jet printer main body 190. The supply/recovery unit 300 supplies ink from the ink tank 130 to an ink reservoir (sub-tank: not shown). In addition, the supply/recovery unit 300 suctions ink from the orifice of a printhead 201 to eliminate an ink discharge error caused by clogging of the orifice of the printhead 201, maintaining and recovering the discharge performance.

As shown in FIG. 13, the ink-jet printer 1000 further comprises a pair of convey rollers 110 for conveying the printing medium 101 in a subscanning direction indicated by an arrow B, a carriage 200 which is guided and supported reciprocally in the widthwise direction of the printing medium 101 (main scanning direction indicated by an arrow A), a carriage motor (not shown) and belt means 270 for reciprocating the carriage 200 in the direction indicated by the arrow A, and the printhead 201 serving as a printing means mounted on the carriage 200.

The carriage 200 supports a plurality of printheads 201 for color printing on the printing medium 101. The printheads 201 are formed from four printheads 201 corresponding to inks of different colors (e.g., Y (Yellow) head, M (Magenta) head, C (Cyan) head, and Bk (Black) head).

To print information on the printing medium 101 by using the ink-jet printer 1000 having the above arrangement, the pair of convey rollers 110 convey the printing medium 101 to a predetermined printing start position. Main scanning by the printhead 201 and subscanning by the convey rollers 110 are repeated to print information on the entire printing medium 101.

More specifically, the carriage belt 270 and the carriage motor (not shown) move the carriage 200 from a predetermined position in the main scanning direction to the direction indicated by the arrow A in FIG. 13, thereby starting printing on the printing medium 101.

After main-scanning printing ends, the carriage 200 is returned to a predetermined position in the main scanning direction (predetermined position before the start of main scanning printing). The printing medium 101 is conveyed by the pair of convey rollers 110 by a predetermined amount in the subscanning direction (direction indicated by the arrow B in FIG. 13).

As described above, the carriage belt 270 and the carriage motor (not shown) move again the carriage 200 from the predetermined position in the main scanning direction to the direction indicated by the arrow A in FIG. 13, printing an image, character, or the like on the printing medium 101.

By repeating the above-described operation, printing of one printing medium 101 ends. The printing medium 101 is then discharged into the stacker 170, completing recording of one printing medium 101.

[Controller of Ink-Jet Printer: FIG. 14]

FIG. 14 is a block diagram showing the arrangement of the controller of the ink-jet printer shown in FIG. 12.

In FIG. 14, the power supply unit 100 supplies a voltage for operating the ink-jet printer main body 190. Reference numeral 701 denotes a memory which stores information about the ink tank. The ink tank 130 comprises the memory 701. Reference numeral 703 denotes a CPU which incorporates memories (RAM, ROM, and the like) for controlling the overall ink-jet printer; and 704, a controller which supplies power to the memory arranged in the ink tank, and turns on/off a power supply for supplying power from the power supply unit 100 to the memory 701 arranged in the ink tank.

The operation panel 120 has a display which externally displays the state of the ink-jet printer main body 190, and an input unit for performing various operations of the ink-jet printer 1000. Reference numeral 705 denotes a separator which separates a control signal to the memory arranged in the ink tank and changes a control signal to a high impedance for the ink tank 130; 706, an ink tank mounting state detector which detects the mounting state of the ink tank 130; 707, an ink tank fixing cover lock controller which inhibits or allows dismounting/mounting of the ink tank 130; and 708, an ink tank fixing cover lock driving unit which locks an ink tank fixing cover (not shown).

Reference numeral 711 denotes a power supply which is turned on/off by the controller 704 for supplying power to the memory arranged in the ink tank, and supplies power from the power supply unit 100 to the ink tank memory 701; and 712, a power supply used when restricting a power supply current supplied from the controller 704 for supplying power to the memory arranged in the ink tank.

Reference numerals 713 and 714 denote a chip select signal and serial clock signal which are control signals for the memory 701 arranged in the ink tank and are supplied to the ink tank 130 via electric contacts (not shown) attached to the ink tank 130.

Reference numerals 715 and 716 denote protection resistors for protecting the ink tank mounting state detector 706 in detecting the mounting state of the ink tank 130; 717, a logic fixing pull-up resistor arranged in the ink tank 130 for the serial clock signal 714; and 718, a logic fixing pull-down resistor arranged in the ink tank 130 for the chip select signal 713.

Reference numeral 719 denotes a pull-up resistor which is higher in resistance than the logic fixing pull-down resistor 718 arranged in the ink tank 130 for the chip select signal 713; and 720, a pull-down resistor which is higher in resistance than the logic fixing pull-up resistor 717 arranged in the ink tank 130 for the serial clock signal 714.

Although not shown in FIG. 14, the CPU 703 controls the operations of the above-described units in accordance with control programs (not shown) stored in the ROM. The CPU 703 is connected to a driving motor (not shown) for reciprocating the carriage 200 in FIG. 13, a motor (not shown) for driving the supply/recovery unit 300, a motor for conveying the printing medium 101, and the like. The CPU 703 also controls the operations of these motors in accordance with predetermined programs (not shown) stored in the ROM.

Figure 1:
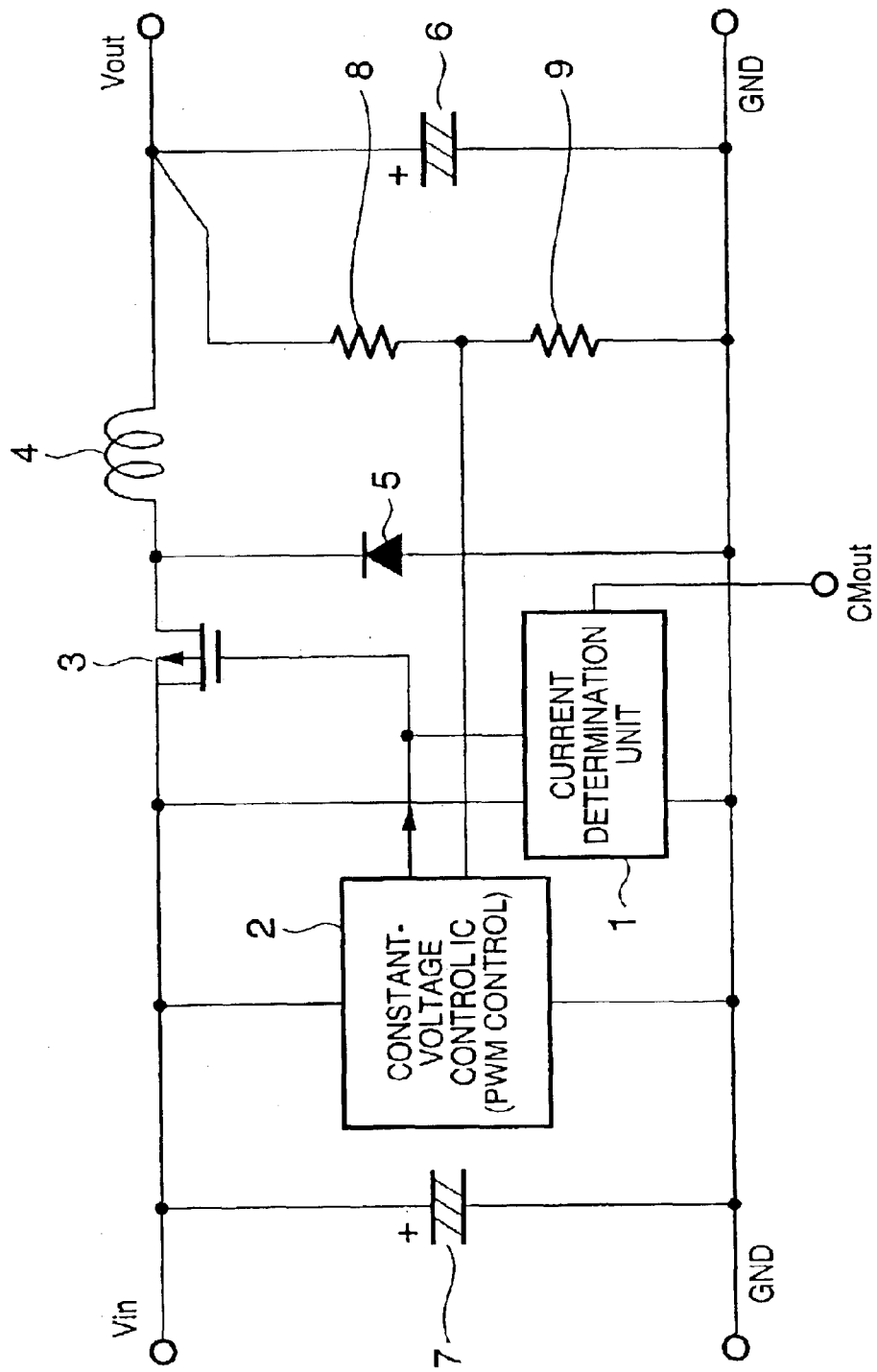
FIG. 1 is a block diagram showing a DC/DC converter according to the first embodiment of the present invention.

[Power Supply Unit With Current Determination Unit: FIG. 1]

Details of the power supply unit 100 will be explained with reference to FIG. 1.

FIG. 1 is a block diagram showing a DC/DC converter having the current determination unit (current determination circuit) 1 as an example of the power supply unit 100.

In FIG. 1, an unnecessary portion is omitted for descriptive convenience because the unnecessary portion (e.g., the external component of a constant-voltage control IC or the like) except a portion necessary for the description of the first embodiment makes the drawing complicated.

In FIG. 1, the DC/DC converter comprises the current determination unit 1. Reference numeral 2 denotes a constant-voltage control IC; 3, a switching MOS transistor; 4, an inductor; 5, a freewheeling diode; 6, an output capacitor; 7, an input capacitor; and 8 and 9, output voltage detection resistors.

Figure 2:
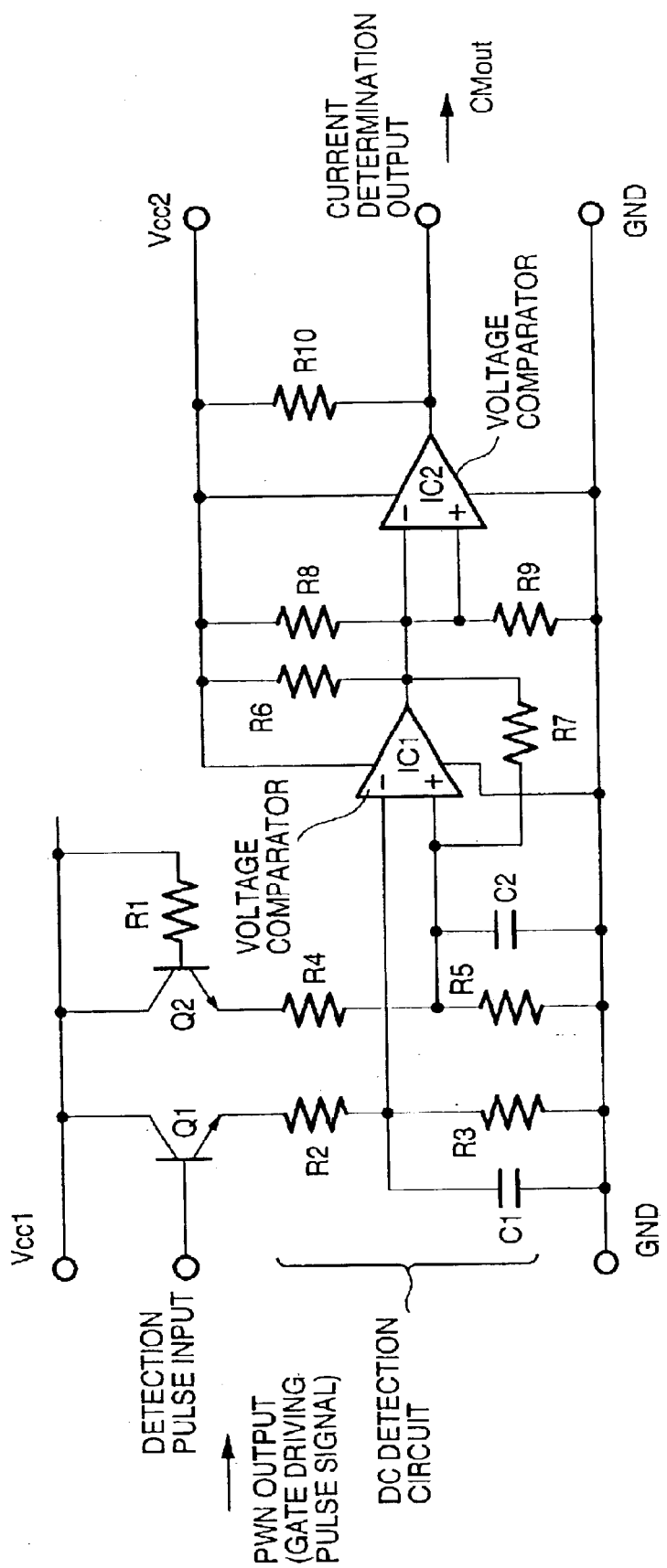
FIG. 2 is a circuit diagram showing a circuit as an example of a current determination unit 1 according to the first embodiment of the present invention.

FIG. 2 shows details of the current determination unit 1, which will be described in detail below. FIGS. 3 to 8B are oscillograph waveform charts showing the operation states of the inductor 4 and switching MOS transistor 3 which change depending on the load when the DC/DC converter shown in FIG. 1 is connected to a load (e.g., an image printing apparatus) and the current is supplied to the load.

[Voltage Conversion Operation of DC/DC Converter]

The operation of the DC/DC converter 100 will be explained with reference to FIGS. 1 to 8.

The DC/DC converter 100 as shown in FIG. 1 is a so-called "step-down circuit", but is not limited to the "step-down circuit" and may be, e.g., a "step-up circuit".

More specifically, in FIG. 1, when the switching MOS transistor 3 of the DC/DC converter 100 is ON, a power supply (e.g., DC 24 V) connected to the $V_{in}$ terminal supplies a current to the load and output capacitor 6 connected to the $V_{out}$ terminal via the inductor 4. At this time, the inductor 4 accumulates energy.

When the switching MOS transistor 3 connected to the power supply unit 100 changes from the ON state to the OFF state, the current supplied from the power supply connected to the $V_{in}$ terminal stops, and the current flowing from the inductor 4 to the load tends to decrease. Counterelectromotive force is generated by the nature of the inductor 4 in a direction in which a decrease in current is prevented (direction of the current flowing from the inductor 4 to the load). If the counterelectromotive force value exceeds the sum ($Vf5+V_{out}$) of the forward voltage (Vf5) of the freewheeling diode 5 in FIG. 1 and the output voltage ($V_{out}$) of the DC/DC converter, the freewheeling diode 5 is turned on. Energy accumulated in the inductor 4 is then supplied as a current to the load (not shown) and the output capacitor 6 via a path of GND (ground or reference potential)→the freewheeling diode 5→the inductor 4.

The DC/DC converter 100 repeats the above-described ON/OFF operation of the switching MOS transistor 3, executing voltage conversion operation of the "step-down circuit".

[Constant-Voltage Operation]

Constant-voltage operation in converter operation of the DC/DC converter 100 will be explained.

The output capacitor 6 is discharged in accordance with the load (not shown) connected between the $V_{out}$ terminal and the GND terminal when the current supplied from the inductor 4 becomes insufficient, and charged when the current supplied from the inductor 4 is sufficient. If the load (not shown) is light and the charge current increases, the potential across the output capacitor 6 rises.

The output voltage is divided and detected by the output voltage detection resistors 8 and 9, and a voltage control value detected by voltage division is returned to the constant-voltage control IC 2. The constant-voltage control IC 2 compares the output voltage detected by voltage division with an internal reference voltage, controls the ON/OFF time of the switching MOS transistor 3 so as to maintain a voltage set in advance by a PWM (Pulse Width Modulation) circuit, and performs feedback control.

In this way, the DC/DC converter 100 can supply a stable voltage to the load.

The state of a current $I_L$ flowing through the inductor 4 changes depending on the current value supplied to the load, and the operation of the DC/DC converter 100 includes several operation modes.

[Operation Modes of DC/DC Converter: FIGS. 3 to 8A]

FIGS. 3 to 8A are oscillograph waveform charts showing the operation states of the inductor 4 and switching MOS transistor 3 in respective operation modes of the DC/DC converter 100.

Figure 3:
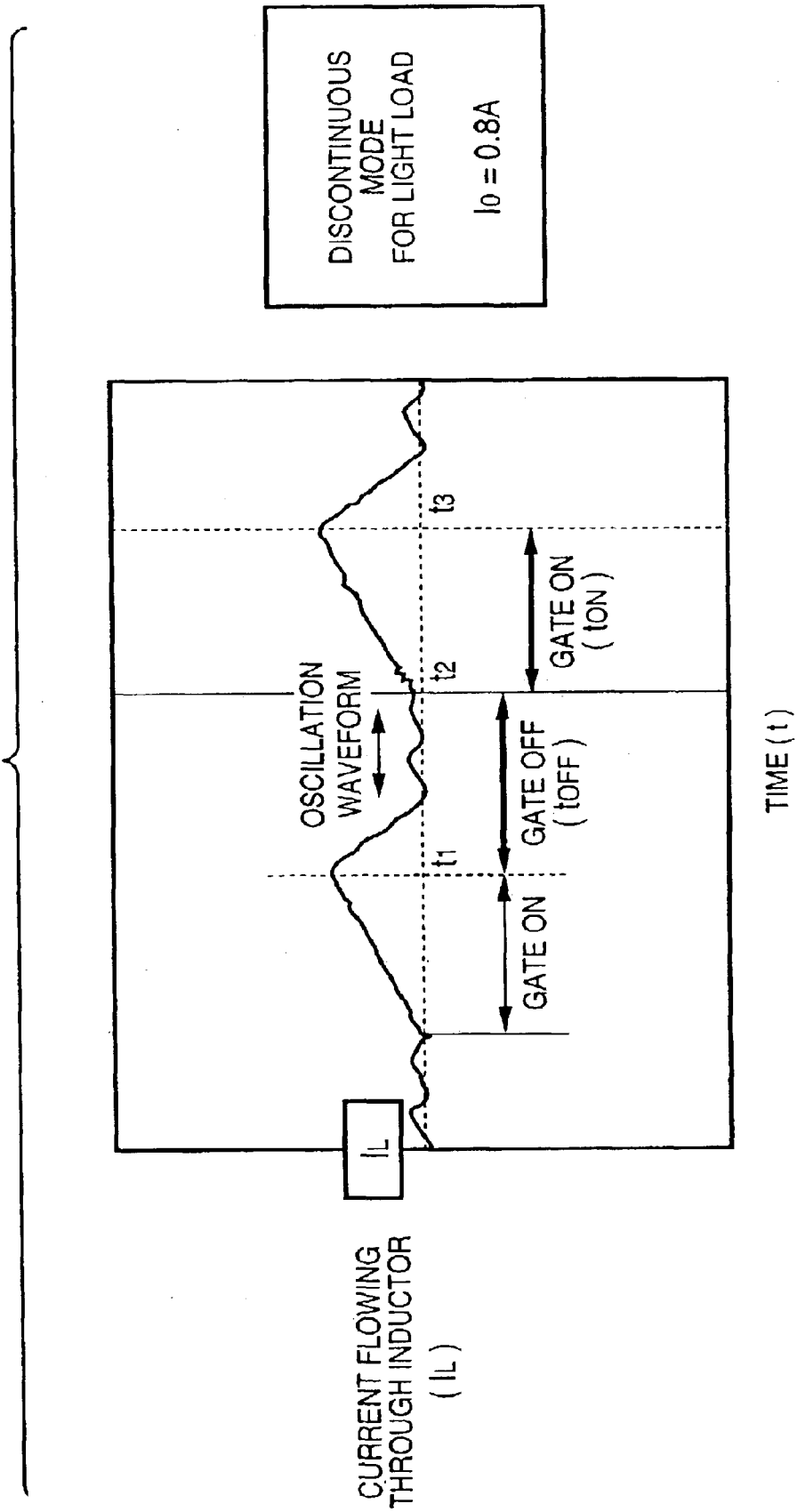
FIG. 3 is a chart showing the oscillograph waveform of an inductor in a discontinuous mode when the DC/DC converter operates.
Figure 4:
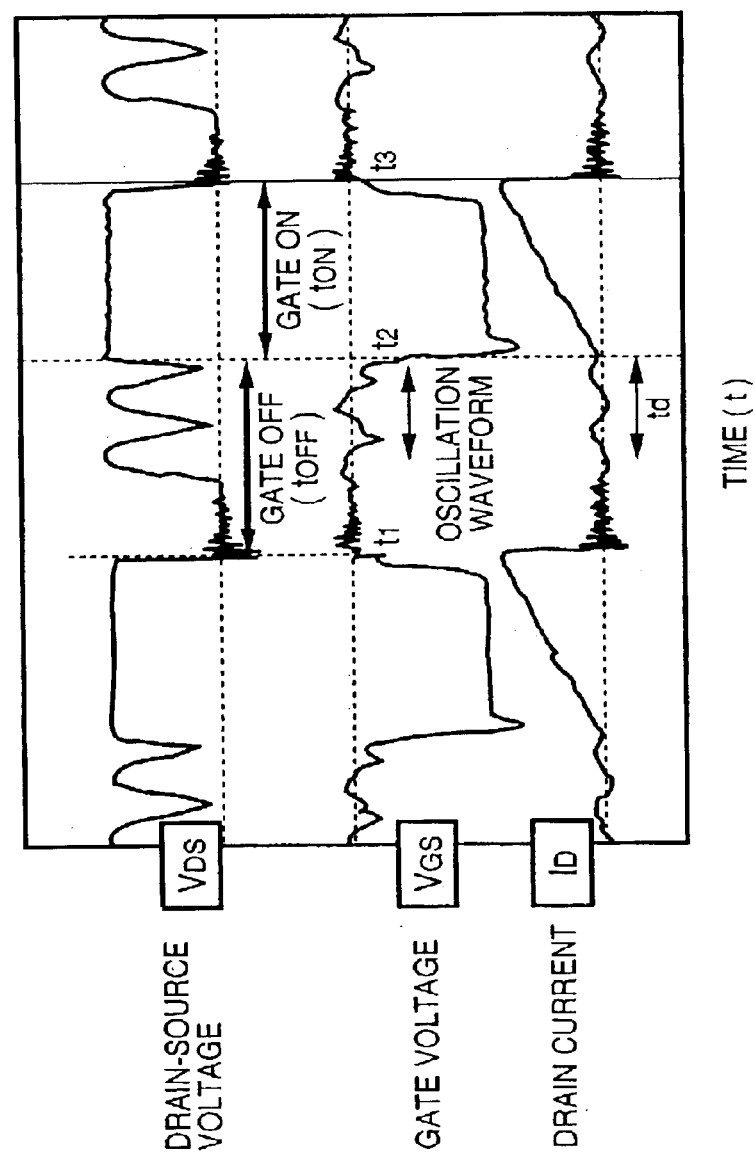
FIG. 4 is a chart showing an oscillograph waveform representing the operation state of a switching MOS transistor in the discontinuous mode.

FIG. 3 shows the waveform of the current $I_L$ flowing through the inductor 4 in a relatively light load state (e.g., $I_0$=0.8 A) called a "discontinuous mode". FIG. 4 shows the waveforms of the drain-source voltage ($V_{DS}$), gate voltage ($V_{GS}$), and drain current ($I_D$) of the switching MOS transistor 3 in the state of FIG. 3. At this time, $I_0$ is the output current of the DC/DC converter. This also applies to the following description.

Figure 5:
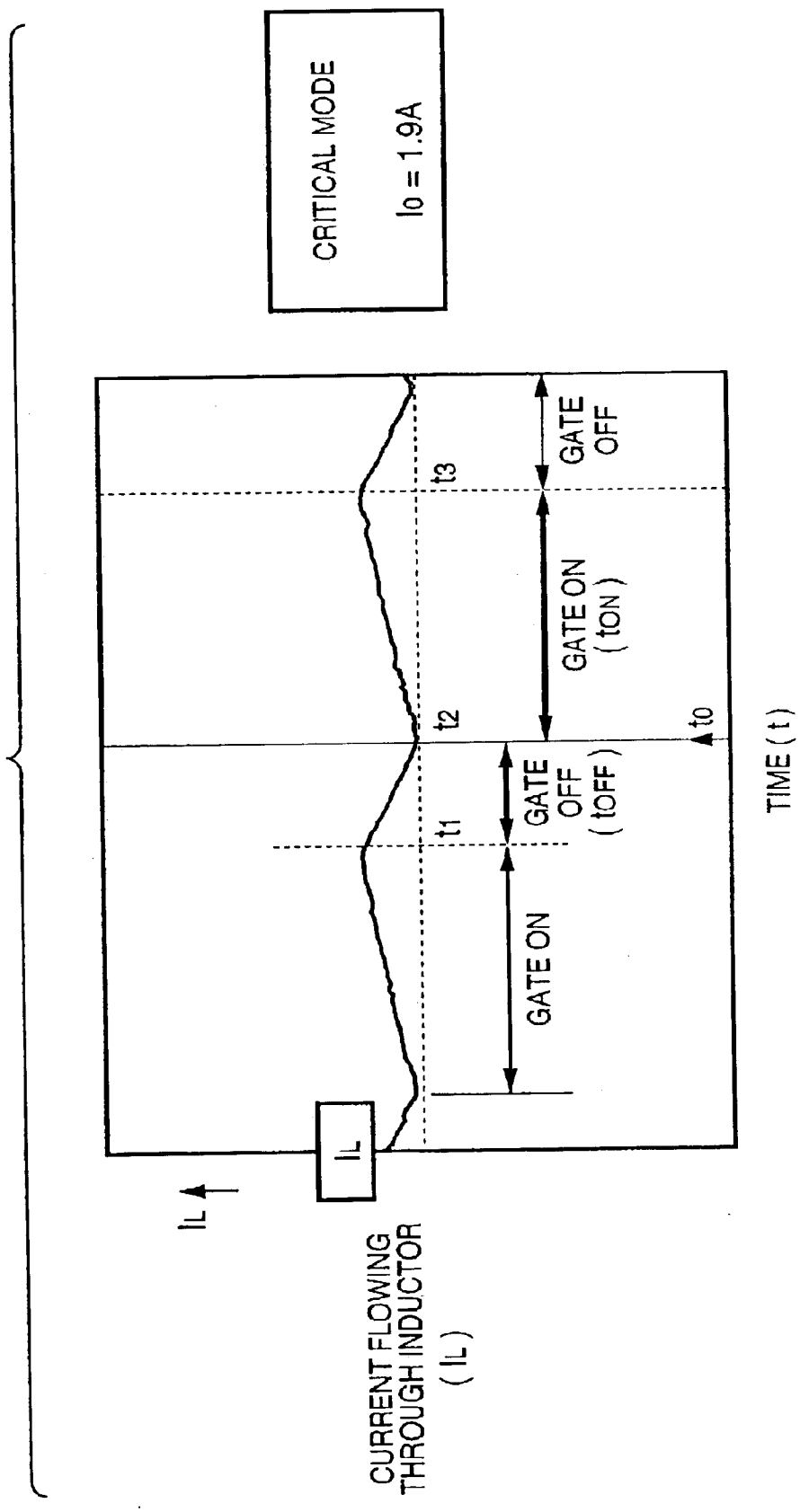
FIG. 5 is a chart showing an oscillograph waveform of the inductor in a critical mode when the DC/DC converter operates.
Figure 6:
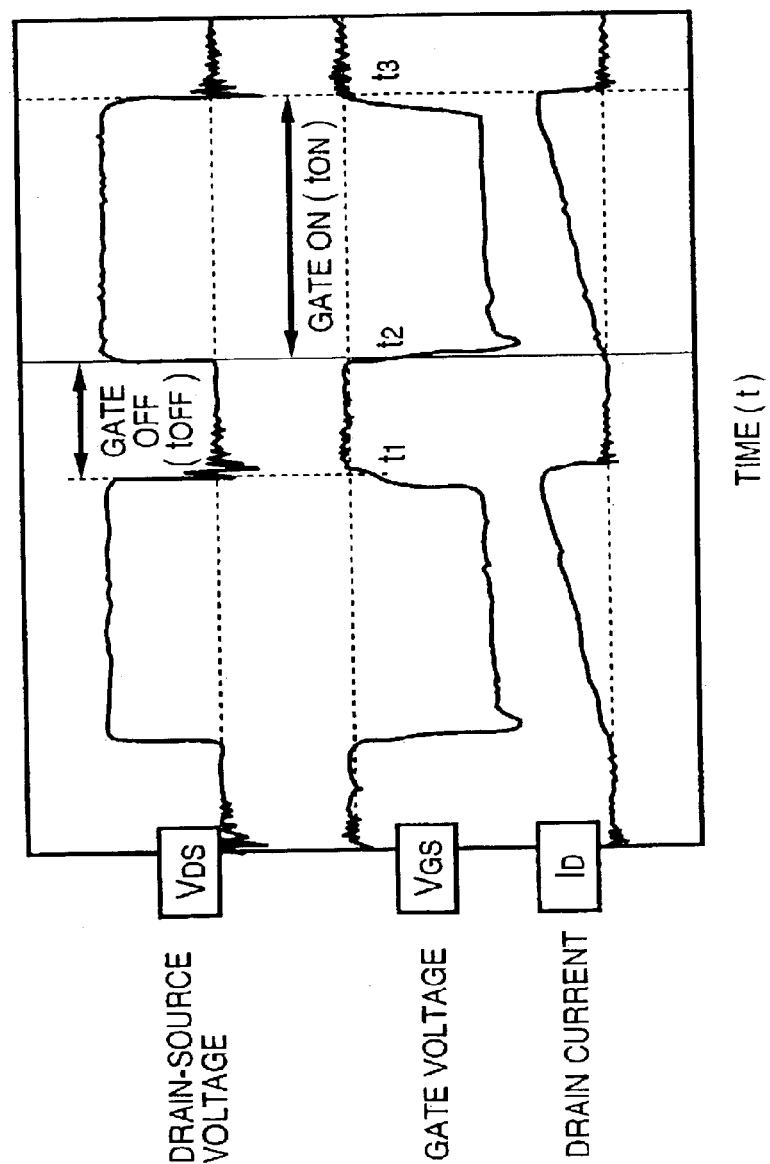
FIG. 6 is a chart showing an oscillograph waveform representing the operation state of the switching MOS transistor in the critical mode.

FIG. 5 shows the waveform of the current $I_L$ flowing through the inductor 4 in a load state (e.g., $I_0$=1.9 A) called a "critical mode". FIG. 6 shows the waveforms of the drain-source voltage ($V_{DS}$), gate voltage ($V_{GS}$), and drain current ($I_D$) of the switching MOS transistor 3 in the state of FIG. 5.

Figure 7:
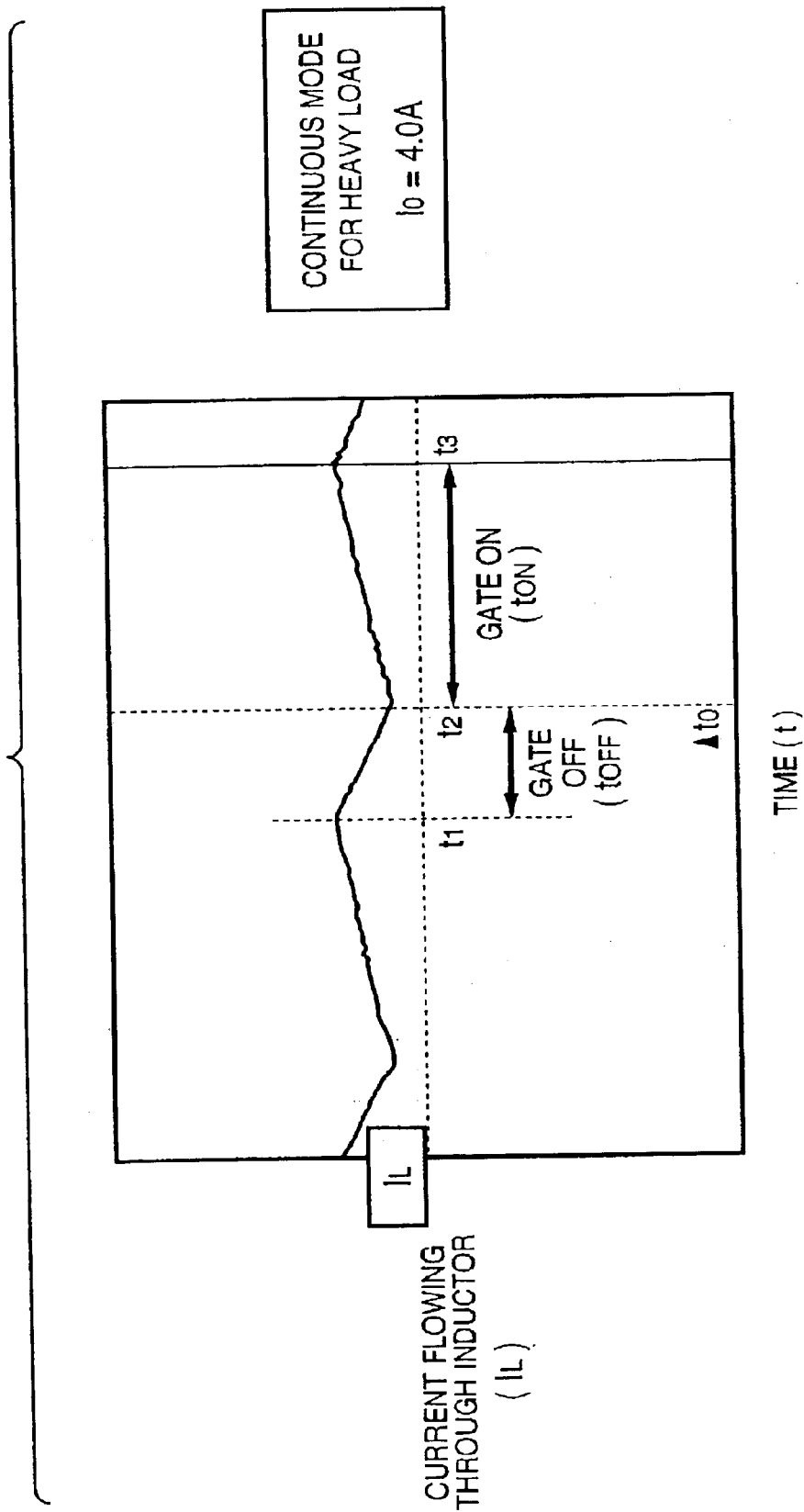
FIG. 7 is a chart showing an oscillograph waveform of the inductor in a continuous mode when the DC/DC converter operates.
Figure 8A:
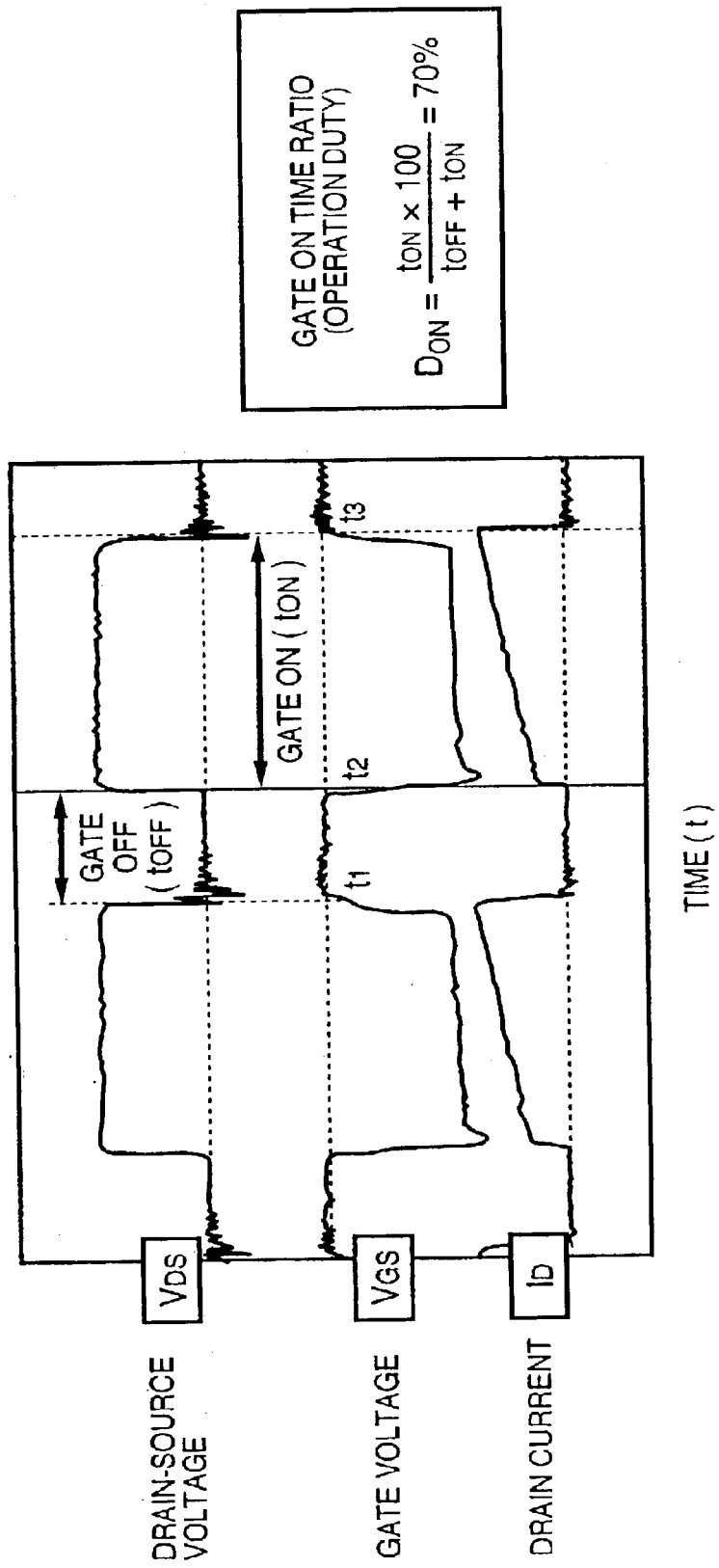
FIG. 8A is a chart showing an oscillograph waveform representing the operation state of the switching MOS transistor in the continuous mode.

FIG. 7 shows the waveform of the current $I_L$ flowing through the inductor 4 in a heavy load state (e.g., $I_0$=4.0 A) called a "continuous mode". FIG. 8A shows the waveforms of the drain-source voltage ($V_{DS}$), gate voltage ($V_{GS}$), and drain current ($I_D$) of the switching MOS transistor 3 in the state of FIG. 7.

[Discontinuous Mode: Light Load]

The "discontinuous mode" will be explained with reference to FIGS. 3 and 4.

The "discontinuous mode" is a mode when all magnetic energy accumulated in the inductor 4 is discharged as a current during the gate OFF period ($t_{off}$) of the gate voltage ($V_{GS}$) PWM-controlled by the constant-voltage control IC 2 and after them a small oscillation waveform of the drain current ($V_D$) is observed during the period $t_d$ until the gate voltage ($V_{GS}$) reaches the gate ON period ($t_{on}$), as shown in FIGS. 3 and 4.

The operation duty ($D_{on}$) of the DC/DC converter 100 is defined by equation (1) and represented as the ratio of the gate ON period to the gate ON/OFF period:

$$D_{on}=(t_{on}\times 100)/(t_{on}+t_{off}) \quad (1)$$

The operation duty ($D_{on}$) is calculated by substituting the gate ON period ($t_{on}$) and gate OFF period ($t_{off}$) obtained from the waveform value of the gate voltage ($V_{GS}$) into equation (1), as shown in FIG. 4. In this case, the operation duty ($D_{on}$) in the "discontinuous mode" of FIG. 3 is 47%.

[Critical Mode]

The "critical mode" will be explained with reference to FIGS. 5 and 6.

The "critical mode" is a mode when all energy accumulated during the gate ON period ($t_{on}$) is discharged as a current during the gate OFF period ($t_{off}$) in the waveform of the current $I_L$ flowing through the inductor 4, and the current is supplied and discharged such that accumulated energy and discharged energy coincide with each other, as shown in FIG. 5.

The operation duty of the DC/DC converter 100 in the "critical mode" is 70% as a result of substituting into equation (1) the gate ON period ($t_{on}$) and gate OFF period ($t_{off}$) obtained from the gate waveform of the gate voltage ($V_{GS}$) PWM-controlled by the constant-voltage control IC 2, as shown in FIG. 6.

[Continuous Mode: Heavy Load]

The "continuous mode" will be explained with reference to FIGS. 7 and 8A.

The "continuous mode" is a mode when not all energy accumulated during the gate ON period ($t_{on}$) is discharged as a current during the gate OFF period ($t_{off}$), and the current is supplied and discharged such that the current flowing through the inductor 4 is accumulated and held as magnetic energy in the inductor 4, as shown in FIG. 7.

The operation duty of the DC/DC converter 100 in the "continuous mode" is 70% as a result of substituting into equation (1) the gate ON period ($t_{on}$) and gate OFF period ($t_{off}$) obtained from the gate waveform of the gate voltage ($V_{GS}$) PWM-controlled by the constant-voltage control IC 2, as shown in FIG. 8A.

The current flowing through the inductor 4 is continuous between the ON state and the OFF state between the "critical mode" and the "continuous mode". Under this condition, the forward voltage Vf5 of the freewheeling diode 5 and a voltage drop Vmos by the ON resistance of the switching MOS transistor 3 are smaller than $V_{in}$ and $V_{out}$. From this, $$I_L=(V_{out}-V_{in})\cdot t_{on}/L=-V_{out}\cdot t_{off}/L$$

(L is the inductance of the inductor 4) is derived and solved into $$D_{on}=(t_{on}\times 100)/(t_{on}+t_{off})=V_{out}/V_{in} \quad (2)$$

It is known that the operation duty ($D_{on}$) is approximately calculated from the ratio of the input voltage ($V_{in}$) to output voltage ($V_{out}$) of the DC/DC converter 100.

FIG. 8B shows the relationship between the current flowing through the load and the operation duty ($D_{on}$) in the respective modes described with reference to FIGS. 3 to 8A. As shown in FIG. 8B, the operation duty (i.e., gate ON period ($t_{on}$)) increases along with an increase in current flowing through the load from the "discontinuous mode" to the "critical mode".

Attention is given to a driving pulse signal (gate voltage $V_{GS}$) which is supplied from the constant-voltage control IC 2 so as to turn on/off the switching MOS transistor 3 and changes depending on the current flowing from the DC/DC converter 100 to the load. The current determination unit 1 of the first embodiment uses the operation duty of the gate driving pulse to detect a current supplied from the DC/DC converter 100 to the load, determines whether the current flowing through the load exceeds a predetermined value, and thus determines the current flowing through the load.

[Current Determination Unit: FIG. 2]

Details of the current determination unit 1 will be described using an example of a current detection circuit and determination circuit shown in FIG. 2.

In FIG. 2, transistors Q, resistors R, capacitors C, and ICs which constitute the current detection circuit and determination circuit are discriminated by assigning unique numbers to the symbols. In FIG. 2, $V_{cc1}$ and $V_{cc2}$ are terminals for supplying power necessary to operate the circuit of the current determination unit 1. GND represents power supply GND. In FIG. 2, power is supplied from the different terminals $V_{cc1}$ and $V_{cc2}$ so as to easily adjust the logic level to a logic circuit which determines a current, but may be supplied from the same power supply.

In FIG. 2, the detection pulse input terminal is connected to the PWM output terminal of the constant-voltage control IC 2 in FIG. 1, i.e., a terminal for inputting the gate driving pulse signal of the switching MOS transistor 3. The current determination output terminal in FIG. 2 corresponds to the output $CM_{out}$ of the current determination unit 1 in FIG. 1.

Q1 operates as a buffer amplifier called an emitter follower using R2 and R3. Even if the detection pulse input terminal is connected to the gate of the switching MOS transistor 3, the buffer amplifier can reduce the influence on circuit operation in the connection.

A circuit which DC-detects an input detection pulse is made up of C1, R2, and R3. The detection time constant is given by the parallel synthetic resistance value of R2 and R3 and the capacitor value of C1. R2 and R3 also operate as a level shift circuit for adjusting the input voltage bias level of IC1 to a proper value because power is DC-divided at the voltage division ratio.

R1, Q2, R4, R5, and C2 constitute a circuit which sets a detection voltage level for deciding a preset current determination level for comparison by the voltage comparator IC1. In FIG. 2, Q1 and Q2 are formed from transistors with almost the same characteristic so as to make the detection voltage level Q1 almost equal to the influence of the emitter follower temperature, thereby minimizing the influence of the temperature on the determination level.

IC1 and IC2 are voltage comparators. Using the two comparators can reduce the influence of the in-phase noise of VCC2 and improve the determination reliability even if the current determination unit 1 shown in FIG. 2 operates within the DC/DC converter 100 where noise is often generated.

Especially, the comparator IC1 positively feeds back an output signal to the positive input via R7. This can give the comparator IC1 a hysteresis characteristic, preventing variations in the determination level of the comparator IC1 by noise at the determination level.

In the above-mentioned way, the current determination unit 1 of the first embodiment compares, with a predetermined voltage set in advance, a voltage obtained by DC-detecting an input gate driving pulse signal (PWN output). The current determination unit 1 outputs, as a current determination output ($M_{out}$), a comparison result of whether the voltage is higher than the predetermined voltage. The current determination unit 1 can determine whether the current flowing from the DC/DC converter 100 to the load exceeds a predetermined current.

The use of the current determination unit 1 of this embodiment enables stably detecting and determining an input detection pulse at a high precision. When the power supply unit 100 (DC/DC converter) having the current determination unit 1 of the first embodiment is used as the power supply unit of the ink-jet printer 1000, current detection for determining a load current flowing through the ink-jet printer 1000 is not executed at a portion where a large current supplied to the load flows. This can prevent any wasteful power loss caused by Joule loss in current detection.

The current determination unit 1 of the first embodiment need not be inserted in a portion where a large current flows, unlike a method using a "current detection resistance" or "current transformer", and the large-current circuit pattern need not be extended. A current loop antenna by no extension of the circuit pattern serving as a radiation noise generation source can be minimized. This realizes current detection and determination almost free from noise.

The current determination unit 1 of the first embodiment performs current detection and determination at the gate drive portion of the switching MOS transistor. The current determination unit 1 can also be integrated in an IC to downsize the device.

The current determination unit 1 determines whether the current value flowing through the load falls within a range of a predetermined current value or larger or a range smaller than the predetermined current value, i.e., which of the two ranges contains the current value. However, the present invention is not limited to this. For example, two or more predetermined current values may be set in advance for the current determination unit 1, and the range within which the current value flowing through the load falls may be determined by comparing the current value with the predetermined current values.

[Ink-Jet Printer Having Power Supply Unit With Current Determination Unit]

An ink-jet printer having the DC/DC converter 100 (power supply unit) with the current determination unit 1 will be described.

Although not mentioned in the above description, intermittent operation in which the pulse ON duty is short or an ON pulse is sometimes output but not output during a given period is executed when the DC/DC converter 100 operates with almost no load.

At this time, in the use of the current determination unit 1 of the DC/DC converter 100, the voltage used to detect a DC current is low. By setting the determination level in accordance with the voltage value, the state can be grasped.

In the first embodiment, switching control of the DC/DC converter is PWM control. The present invention can also be applied to a method called PFM (Pulse Frequency Modulation) control with a constant ON time or constant OFF time because a change in load current changes the duty and DC detection level.

The DC/DC converter 100 having the current determination unit 1 is adopted as the power supply unit of the ink-jet printer 1000. Even if ink cannot be discharged owing to leakage generated in the internal heater resistor of a nozzle by any cause within the heater board of the printhead 201, an error signal ($CM_{out}$) based on the above-described current determination can be exchanged at the non-printing timing of the printer in a pre-printing operation sequence between the DC/DC converter 100 having the current determination unit 1 and a system controller which controls the ink-jet printer main body. The system controller can prevent before printing a printing error of printing an image while a defective nozzle cannot print part of the image. Since a printing error can be prevented before printing, wasteful use of paper or ink can be avoided.

[Second Embodiment]

The second embodiment will be described below.

An ink-jet printer 2000 which incorporates a DC/DC converter 200 serving as a power supply unit will be explained first. The DC/DC converter serving as a power supply unit having a current determination unit 1, and an application of this DC/DC converter as the DC/DC converter 200 serving as the power supply unit of the ink-jet printer 2000 will then be described.

Except the DC/DC converter 100, the ink-jet printer 2000 which incorporates the DC/DC converter 200 of the second embodiment has the same arrangement as that of the ink-jet printer 1000 which incorporates the DC/DC converter 100 described in the first embodiment. Only the DC/DC converter 200 as the power supply unit of the second embodiment different from that of the first embodiment will be described. The same reference numerals as in the arrangement of the ink-jet printer 1000 described in the first embodiment denote the same parts, and repetitive illustration and description thereof will be omitted.

Figure 9:
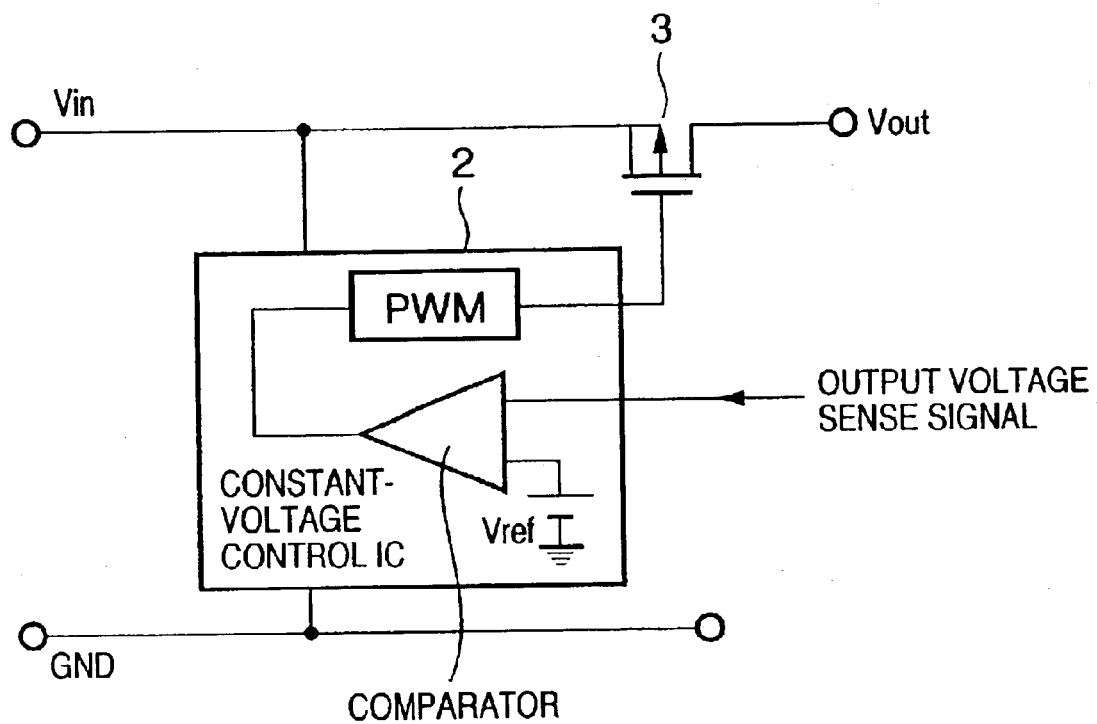
FIG. 9 is a block diagram showing a constant-voltage control IC and switching MOS transistor extracted from a conventional DC/DC converter.
Figure 10:
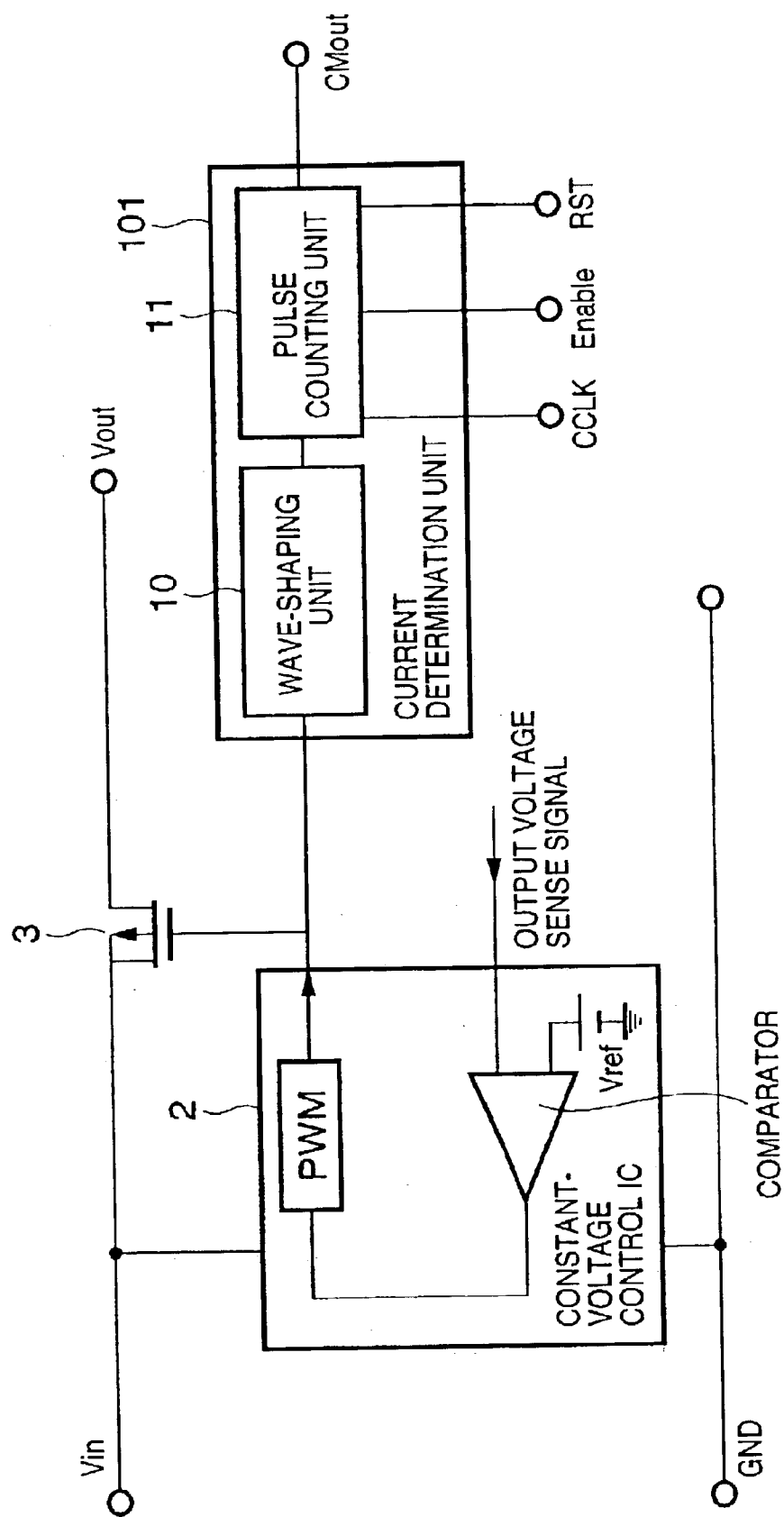
FIG. 10 is a block diagram showing a constant-voltage control IC, switching MOS transistor, and current determination unit extracted from a DC/DC converter according to the second embodiment of the present invention.

[DC/DC Converter and Current Determination Unit: FIGS. 9 and 10]

FIG. 9 is a block diagram showing a constant-voltage control IC 2 and switching MOS transistor 3 extracted from the DC/DC converter of a conventional ink-jet printer.

FIG. 10 is a block diagram showing only a constant-voltage control IC 2, switching MOS transistor 3, and current determination unit 101 as part of the DC/DC converter 200 according to the second embodiment.

From the comparison between FIGS. 10 and 9, the DC/DC converter 200 of the second embodiment is different from the conventional DC/DC converter in the current determination unit 101 having a wave-shaping unit 10 and pulse counting unit 11. The function of the current determination unit 101 is the same as that of the current determination unit 1 according to the first embodiment. The current determination unit 101 determines whether a current supplied from the DC/DC converter 200 to the load exceeds a predetermined current.

The current determination unit 1 of the first embodiment is different from the current determination unit 101 of the second embodiment in the following point. The current determination unit 1 of the first embodiment determines the current flowing through the load by detecting by DC detection the operation duty of the gate driving pulse signal of the switching MOS transistor 3 supplied from the constant-voltage control IC 2 of the DC/DC converter 100. To the contrary, the current determination unit 101 of the second embodiment determines the current flowing through the load by directly measuring the operation duty (i.e., gate ON time) of the gate driving pulse signal.

There are various time measurement means. In the second embodiment, a CCLK pulse whose time width is defined in advance and a gate pulse generated from the operation duty of the gate driving pulse signal of the switching MOS transistor 3 are ANDed.

CCLK-wide pulses output from the wave-shaping unit 10 are counted by the pulse counting unit 11. The time width of the gate ON time of the gate driving pulse signal is measured. The measured time width is compared with a preset time width, thereby determining whether the current flowing through the load exceeds a predetermined current (load current determination). This will be explained in detail with reference to FIG. 11.

Figure 11:
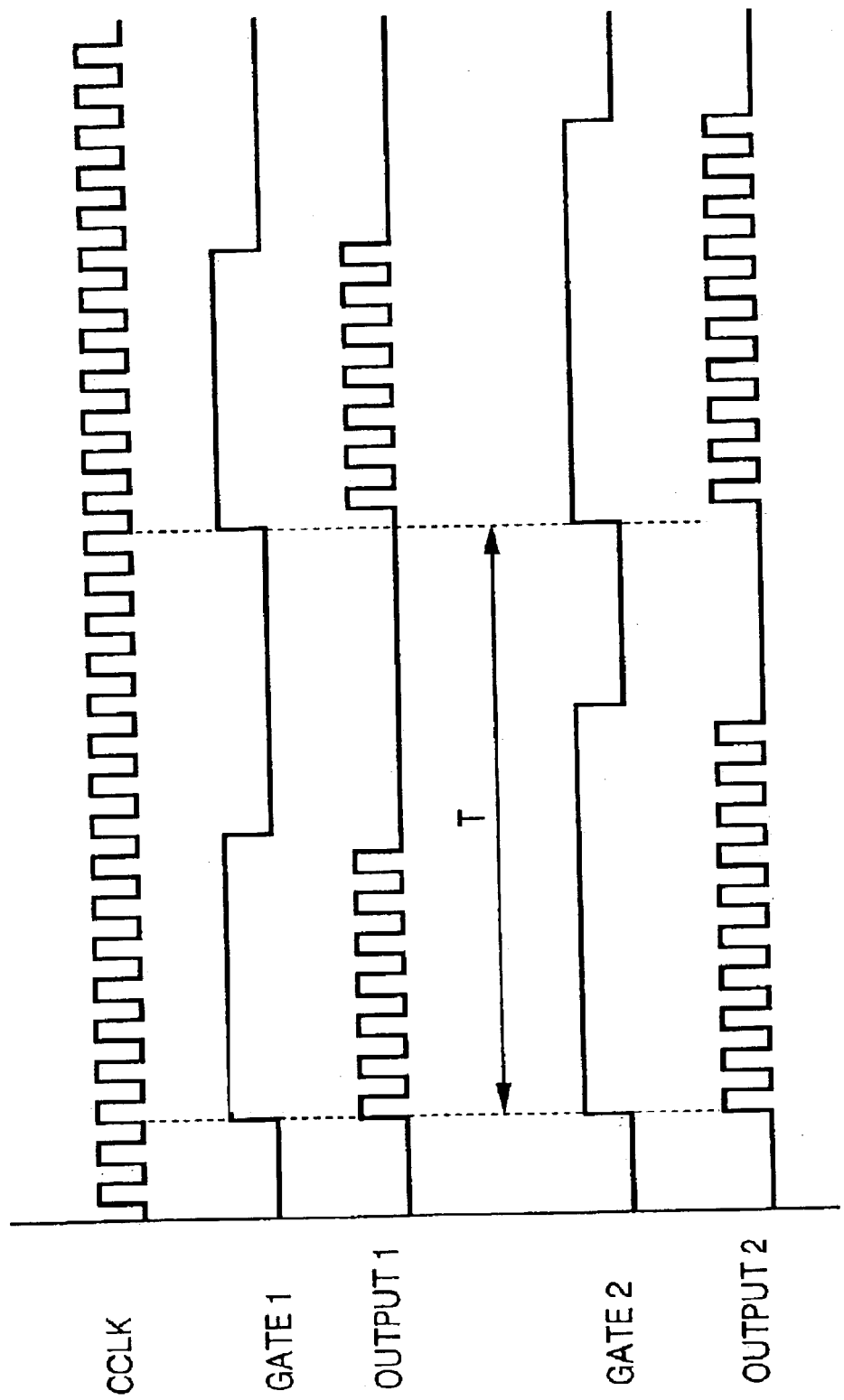
FIG. 11 is a timing chart showing the operation timing of each portion in the circuit block of FIG. 10.

FIG. 11 shows the operation timing of each portion in the circuit block shown in FIG. 10.

The wave-shaping unit 10 shown in FIG. 10 comprises a voltage comparator exhibiting hysteresis as described above with reference to FIG. 2 because the logic edge becomes ambiguous by directly comparing the gate waveform of the gate voltage $V_{GS}$ shown in FIGS. 4, 6, and 8A by a logic circuit. The voltage comparator converts a signal into a pulse at the logic circuit level, measuring the time.

In FIG. 11, a signal Gate1 is an example upon detection of the load current $I_0$=0.8 A. The number of CCLKs counted by the pulse counting unit 11 is, e.g., 7, as represented by an output (1) in FIG. 11.

A signal Gate2 is an example upon detection of the load current $I_0$=1.9 A or higher. The number of CCLKs counted by the pulse counting unit 11 is, e.g., 10, as represented by an output (2) in FIG. 11.

A counter which generates a carry signal when the number of pulses counted in the above-described fashion reaches a preset count value (set count value) is prepared. The counter carry signal is set as the current determination output signal $CM_{out}$ of the current determination unit 101.

For example, for the set count value=7, when the DC/DC converter 200 operates at the load current $I_0$=0.8 A or lower, $CM_{out}$ is kept low because the number of counted pulses is smaller than 7. When the DC/DC converter 200 operates at the load current $I_0$=1.9 A or higher, $CM_{out}$ changes to high level because the number of counted pulses is 10 which is larger than 7. As a result, whether the current flowing through the load exceeds a predetermined current can be determined.

In the above description, the detection precision can be easily increased by increasing the CCLK frequency. By forming the counter from a programmable counter, the load state determination level can be arbitrarily set in accordance with an instruction from an external controller, e.g., a CPU 703 of the ink-jet printer as far as the determination level can be monitored as a duty change.

The ink-jet printer 2000 having the DC/DC converter 200 with the current determination unit 101 will be described.

Although not mentioned in the above description, intermittent operation in which the pulse ON duty is short or an ON pulse is sometimes output but not output during a given period is executed when the DC/DC converter 200 operates with almost no load. This state can be grasped by decreasing the count at which the counter carry signal of the current determination unit 101 is generated.

A case in which the DC/DC converter 200 which incorporates the current determination unit 101 is used as the power supply unit of the ink-jet printer 2000 and an output from the DC/DC converter 200 is supplied as power for a printhead 201 will be described.

In FIG. 10, signals CCLK, $E_{nable}$, and RST are supplied from the system controller (not shown) of the ink-jet printer 2000. The system controller controls the operation of the ink-jet printer, and is comprised of a CPU, a ROM which stores a program for operating the CPU, a RAM which temporarily stores data for operation, a gate array, and the like.

The signal timings of CCLK, $E_{nable}$, and RST are non-printing timings of the ink-jet printer 2000. After the signal $E_{nable}$ is supplied, the counter operates. With this setting, a load current such as a leakage current which flows regardless of a non-load state in which no load current should flow can be detected.

In this manner, the DC/DC converter 200 having the current determination unit 1 is adopted as the power supply unit of the ink-jet printer 2000. Even if ink cannot be discharged owing to leakage generated in the internal heater resistor of a nozzle by any cause within the heater board of the printhead 201, an error signal ($CM_{out}$) based on the above-described current determination can be exchanged at the non-printing timing of the printer in a pre-printing operation sequence between the DC/DC converter 200 having the current determination unit 101 and a system controller which controls the ink-jet printer main body. The system controller can prevent before printing a printing error of printing an image while a defective nozzle cannot print part of the image. Since a printing error can be prevented before printing, wasteful use of paper or ink can be avoided.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of a so-called on-demand type and continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit, but also a cartridge type printing head, in which an ink tank is integrally arranged on the printing head itself, can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In this case, as described in Japanese Patent Laid-Open No. 54-56847 or Japanese Patent Laid Open No. 60-71260, ink may be supplied in a form of perforated sheet opposed to the electrothermal transducer in which the ink is maintained in liquid or solid state within a dent or a through-hole therein. In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program. In this case, the program code read from the storage medium realizes the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which is read by a computer. The present invention includes a case where an OS (operating system) or the like working on the computer performs a part of or an entire process in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, a CPU or the like contained in the function expansion card or function expansion unit performs a part of or an entire process in accordance with designations of the program code and realizes functions of the above embodiments.

As described above, determination of a current flowing to the load from the current supply unit (DC/DC converter) using the current determination unit of each of the above embodiments does not use any current detection resistance or any ON resistance of a switching MOS transistor. Hence, no unwanted Joule loss is generated in detecting a load current. The power supply unit can be implemented at lower cost than a current detection coil or a current detection method using a Hall element. The current supply unit (DC/DC converter) having the current determination unit can be applied to a printer. In this case, even if any error occurs in the printhead during the use of the printer, the error can be detected before printing, preventing wasteful printing suffering the printing error.

In the description of the above embodiments, a printer is exemplified as a load. However, the DC/DC converter having the current determination unit can be applied to many electrical devices within the scope of the present invention as long as a current can be supplied to the load from the DC/DC converter having the current determination unit of the above embodiment and signals can be exchanged between the device controller and the DC/DC converter. Also in this case, the same effects as those described above can be expected.

As has been described above, the present invention can provide a current determination circuit capable of determining that the current falls within a proper range while preventing an increase in cost in current detection and reducing Joule loss caused by an unwanted resistance component without employing any method such as a method using a current detection resistance, a method using the ON resistance of a switching MOS transistor, or a current detection method using a current detection coil or Hall element when a power supply device which converts a voltage by a switching method using a semiconductor element is connected to a load (electrical device) and it is determined whether a current supplied from the power supply device to the load falls within a proper range.

Further, the present invention can provide an image printing apparatus which uses a power supply device having the current determination circuit as a power supply device for supplying power in the image printing apparatus, and even if a printhead error occurs in printing, can detect the error before printing and prevent wasteful printing suffering from the printing error.

As many apparently widely different embodiments of the present invention can be made without departing from the spirit and scope thereof, it is to be understood that the invention is not limited to the specific embodiments thereof except as defined in the claims.

What is claimed is:

1. A current determination circuit which determines a current value supplied to a load from a power supply device having a power supply circuit which converts an input voltage by turning on/off switching means, comprising:
    detection means for detecting a predetermined signal on the basis of an ON/OFF signal to turn on/off the switching means; and
    current determination means for determining based on the predetermined signal, of a plurality of ranges, a range within which the current value supplied from the power supply device to the load falls.

2. The circuit according to claim 1, wherein the plurality of ranges are two ranges including a range in which the current value is not less than a predetermined current value, and a range in which the current value is smaller than the predetermined current value.

3. The circuit according to claim 1, wherein said detection means DC-detects the ON/OFF signal to detect a voltage level corresponding to the ON/OFF signal.

4. The circuit according to claim 3, wherein said current determination means compares the voltage level with a predetermined voltage level set in advance, and when the voltage level exceeds the predetermined voltage level, determines that the current value supplied from the power supply device to the load is not less than a predetermined value.

5. The circuit according to claim 1, wherein said detection means detects a time width corresponding to an ON time of the ON/OFF signal.

6. The circuit according to claim 5, wherein said current determination means compares the time width with a predetermined time width set in advance, and when the time width exceeds the predetermined time width, determines that the current value supplied from the power supply device to the load is not less than a predetermined value.

7. The circuit according to claim 1, wherein the power supply device includes a DC/DC converter which steps up or down the input voltage.

8. The circuit according to claim 7, further comprising discontinuous mode determination means for determining based on the ON/OFF signal whether a mode of a current flowing through an inductor of the DC/DC converter is a discontinuous mode in which all energy accumulated in the inductor during an ON signal period of the ON/OFF signal is discharged during an OFF signal period, or a continuous mode in which not all energy accumulated in the inductor during the ON signal period of the ON/OFF signal is discharged during the OFF signal period but energy is accumulated in the inductor.

9. The circuit according to claim 8, wherein said discontinuous mode determination means determines, as the discontinuous mode, a case in which an oscillation waveform is generated during the OFF signal period of the ON/OFF signal.

10. An image printing apparatus comprising a power supply device having a power supply circuit which converts an input voltage by turning on/off switching means, and a current determination circuit which determines a current value supplied from the power supply device to a load,
    said current determination circuit having
        detection means for detecting a predetermined signal on the basis of an ON/OFF signal used to turn on/off the switching means, and
        current determination means for determining based on the predetermined signal, of a plurality of ranges, a range within which the current value supplied from the power supply device to the load falls.

11. The apparatus according to claim 10, wherein a timing at which a current flowing from said power supply device to the image printing apparatus is determined using said current determination circuit includes a timing when the image printing apparatus does not print an image.

12. The apparatus according to claim 10, further comprising an ink-jet printhead which discharges ink to print information.

13. The apparatus according to claim 12, wherein said printhead discharges the ink by using heat energy, and comprises a heat energy converter for generating the heat energy to be applied to the ink.

* * * * *